Oct. 1, 1940.  E. T. WILSON  2,216,306
WATERPROOF MATERIAL AND METHOD OF PRODUCING THE SAME
Filed Nov. 29, 1938
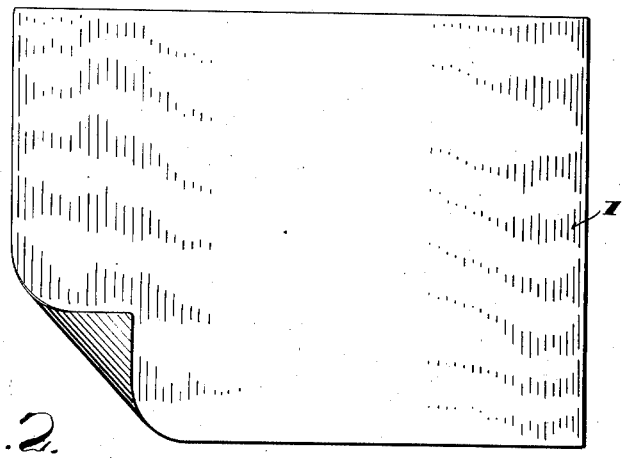
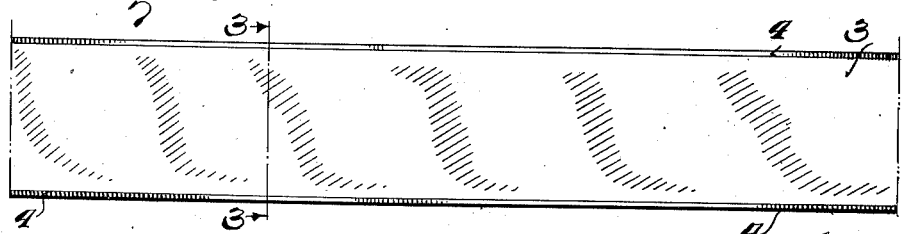
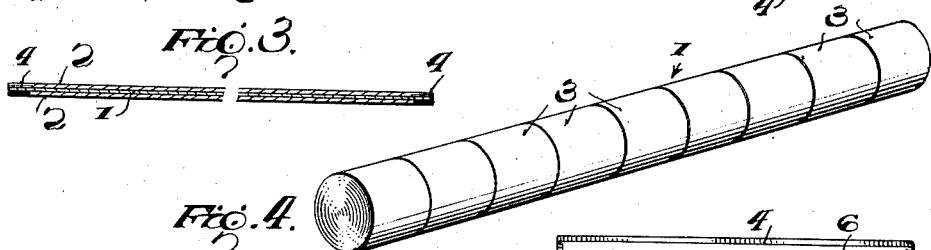
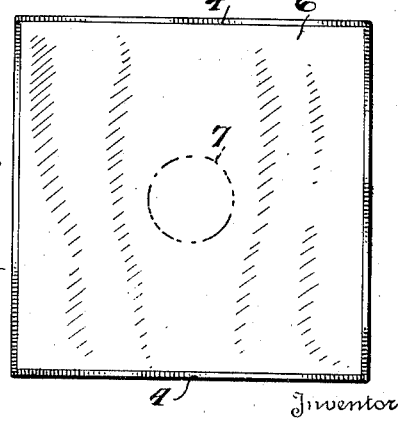
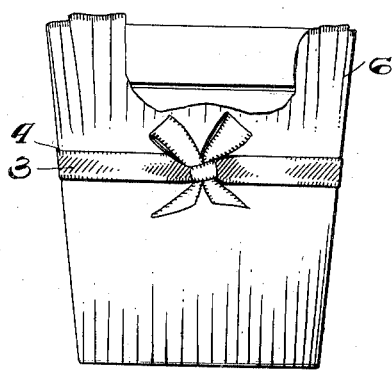
Inventor
Edwin T. Wilson.
By
Attorney Patented Oct. 1, 1940

2,216,306

UNITED STATES PATENT OFFICE 2,216,306

WATERPROOF MATERIAL AND METHOD OF PRODUCING THE SAME

Edwin T. Wilson, Rochester, N. Y., assignor to A & S Ribbon Company, New York, N. Y., a corporation of New York Application November 29, 1938, Serial No. 243,041

2 Claims. (Cl. 41—24)

This invention relates to decorative waterproof material and has for one object, the provision of a decorative ribbon for the florist trade, designed particularly for tying bouquets, corsages or the like and without danger of spotting the ribbon when spraying the tied bouquets, corsages and the like and thereby producing an effective and attractive ribbon which may be tied in bow or other formation in association with the bouquets, corsages or the like.

Another object of the invention resides in the provision of a decorative waterproof ribbon for covering unsightly terra cotta types of flower pots or the like, to conceal the same, so that sprayed water or dripping water incident to watering the plants or flowers in the pots will not mar or discolor the wrapper tied by waterproof ribbon or otherwise maintained about the pot.

A further object of the invention goes to the method of preparing the material for the above-mentioned purposes and which consists of the use of lawn sheeting, muslin or any other suitable woven fabric in relatively wide sheets. These sheets are coated on both flat faces with cellulosic material, such as pyroxylin possessing a coloring agent and the color on both flat faces of the fabric material may be the same or of different colors, depending upon tastes. This coating of the opposite sides or faces of the fabric sheets by payroxylin or other suitable waterproof material may be applied to the fabric in any well-known manner. The separate waterproof sheets may be rolled in a rolled condition and cut by any suitable cutting means into ribbons of desired widths or the prepared material may be otherwise cut into strips, squares or other sheets for the purpose of providing ribbons for various purposes or wrappers for flower pots or for other tying or wrapping purposes.

With these and other objects in view, the invention consists in the methods herein recited and in the construction and novel arrangement of parts hereinafter fully described, illustrated in the accompanying drawing and pointed out in the claims hereto appended, it being understood that various changes in the methods, form, proportions and minor details of construction, within the scope of the claims, may be resorted to without departing from the spirit or sacrificing any of the advantages of the invention.

In the drawing:

Fig. 1 is a plan view of a sheet of fabric having waterproof material applied thereto on both sides or faces and at one corner rolled up slightly.

Fig. 2 is a fragmentary plan view of a ribbon strip cut from the waterproof sheet material, illustrating the embossed edges of the ribbon strip.

Fig. 3 is a sectional view of a ribbon strip as cut from the waterproof sheet material taken along the line 3—3 of Fig. 2.

Fig. 4 is a view illustrating a rolled sheet of the waterproof material ready to be cut into ribbons of desired widths or all of the same width or which may be unrolled and otherwise cut into ribbons.

Fig. 5 is a view illustrating the decorative waterproof material used for covering and decorating terra cotta or other flower pots, illustrating the application of the invention when used for wrapping the flower pots and also illustrating the application of a tying ribbon about the wrapper as one means for maintaining the wrapper on the flower pot.

Fig. 6 illustrates a rectangular blank, although it may not necessarily be rectangular in formation, used for flower pot covering.

In carrying the present invention into practice, I take a relatively long and wide sheet of closely woven fabric, such as lawn sheeting, muslin or the like 1, and coat the opposite flat faces of this fabric material with pyroxylin or cellulose 2 possessing a coloring agent. The coloring on both of the flat faces of the fabric may be the same, or the color effect on one flat face may be of a different color effect than that of the opposite flat face. This coating of the opposite flat faces of the fabric sheets by pyroxylin or other suitable colored waterproof material may be applied to the fabric in any well-known manner, and it is embossed on both flat sides of the fabric material to give the fabric material a sheen or the appearance of a glossy or satin finish.

After providing narrow ribbon strips 3, the edges of the ribbon strip material are embossed as at 4 to give the appearance of a ribbon woven on a narrow loom and to prevent fraying at the edges of the ribbons, as well as to give the general appearance of woven fabric. The edge embossing may be accomplished through the medium of pressure rollers through which the ribbon strip material is passed, or in any other suitable manner. This embossing of the edges of the ribbon strips by superposing embossing on the previously embossed flat faces of the material effects a compacting of the fibres and the coating at the edges of the ribbon strips, strengthening the edges, preventing fraying of the edges of the strip material. Where the edges of a ribbon strip at one side are first embossed and the material turned over to emboss the opposite edges of the other flat side of the strip, some of the grains of the coating material are forced out of the first embossed side and into the body of the material and gives a duller color effect along the embossed edges of the flat side first embossed than along the edges of the other flat side, resulting in an additional coloring effect in addition to strengthening the edges and preventing fraying of the edges of the material.

After preparing the sheets of fabric as aforesaid, the separate sheets may be rolled tightly, and in a tightly rolled condition, cut by any suitable cutting means into ribbons 3 of desired widths and where the ribbons are of lengths longer than necessary the same may be cut transversely in any suitable manner to provide suitable lengths of ribbons for the purposes desired. If preferred, the ribbons may be cut from the flat treated sheets by use of scissors or knives of suitable cutting mechanism rather than resort to cutting of the material in the aforesaid tightly wound condition.

When the material is used for decorating the common terra cotta types of flower pots to conceal the latter, a square or other shaped piece of material is cut from the waterproofed sheets. For instance, in Fig. 6 there is shown a rectangular form of wrapper 6 and the flower pot is generally placed centrally of the wrapper, as for instance, at the dotted line formation 7 in the center of the wrapper and then the wrapper is folded, generally by hand, about the pot in a pleated condition, extending above the edges of the pot to completely conceal the latter and then the folded wrapper is generally tied with a cord, but in this instance, by one of my waterproof ribbons 3, as shown in Fig. 3. The edges of the flower pot wrapper may be edged as in the described way in which the ribbons may be edged if desired.

The invention provides for a very attractive display of flowers on stands or in homes and the waterproofing characteristics of the ribbons and wrappers prevents unsightliness due to water spots incident to watering or spraying the flowers and as cut flowers in the form of bouquets and corsages are frequently sprayed with water, the tapes or other elements heretofore used for tying the bouquets or corsages have become spotted or marred and unsightly and it is for this reason that I have provided the new type of tie and wrapper for use particularly in the florist trade.

What is claimed is:

1. As a new article of manufacture, a piece of fabric having coextensive coating of cellulosic material embossed on the opposite flat faces thereof and having the opposite faces of the coated embossed piece of fabric embossed along opposite edges of both flat faces over the embossed flat faces to strengthen the material at the edges and to prevent fraying of the material at the edges thereof, a portion of the cellulosic coating material along one edge of the piece of fabric being forced into the interstices of the fabric along said edge.

2. The herein described method of preparing pieces of material for various uses which consists in coextensively coating both flat faces of a piece of fabric with cellulosic material, then embossing the coated piece coextensively on both sides thereof, embossing the marginal regions of the piece of fabric on one flat face thereof along one edge over the previous embossing, embossing the marginal regions of the piece of fabric on the opposite flat face along the opposite edge thereof over the initial embossing and forcing a portion of the cellulosic material along said first-mentioned edge into the fabric material to produce a dull color effect along said edge and to strengthen the edge and prevent fraying of the material thereat.

EDWIN T. WILSON.